United States Patent Office 3,375,608
Patented Apr. 2, 1968

3,375,608
PIVOTED WINDOW LOUVRES
Norman Thompson, Wightwick, England, assignor to Beta Aluminium Products Limited, Bridgnorth, Shropshire, England, a British company
Filed July 13, 1965, Ser. No. 471,546
8 Claims. (Cl. 49—403)

ABSTRACT OF THE DISCLOSURE

The combination of a frame and a louvre end fitting for a pivoted window louvre comprising an elongated member having a groove or channel on one side for receiving a louvre panel, and a wiper blade on the opposite side for engagement with the surface on one side of the frame, a boss intermediate the ends of the elongated member for engagement with the surface of the surrounding frame, and spring means acting to exert a force on the boss urging it into contact with the frame.

---

Figure 1:
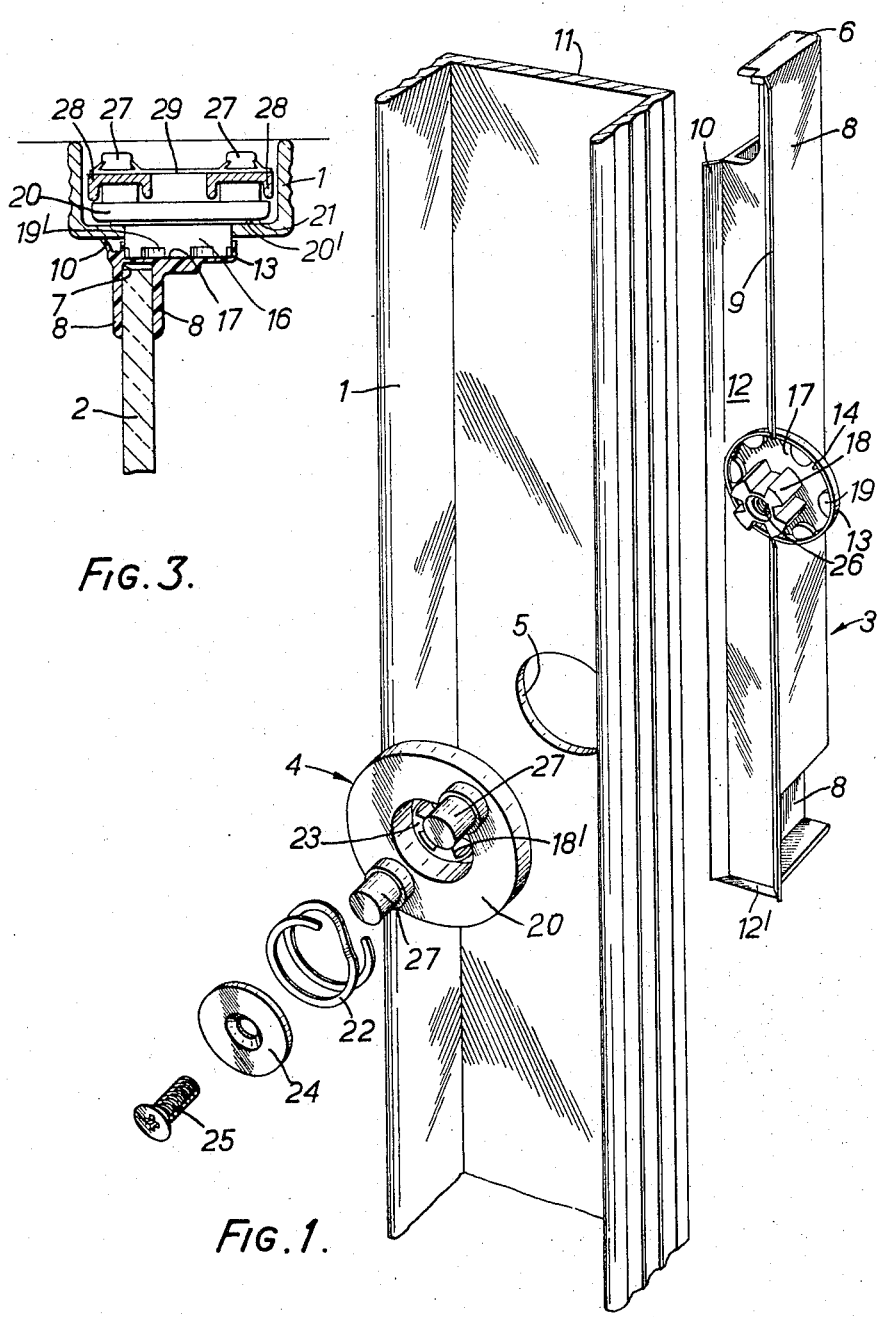

This invention relates to pivoted window louvres and in particular to louvre end fittings, designed to be attached to the edge of such louvres.

It is an object of the invention to provide an improved louvre end fitting which will be simple to manufacture and assemble, and of good appearance, and which will provide an effective seal between the louvre panel and the surrounding frame to prevent entrance of water.

From one aspect the invention consists in a louvre end fitting for a pivoted window louvre, comprising an elongated channel member having a groove on one side to receive the edge of a louvre panel, and at least one wiper blade on the other side, and a boss intermediate the ends of the channel member and off-set inwards from the longitudinal centre line, so that at least one wiper blade provides a substantially straight continuous edge.

From another aspect the invention consists in a louvre end fitting for a pivoted window louvre, comprising an elongated member having a groove on one side to receive the edge of a louvre panel, and at least one wiper blade on the opposite side for engagement with the surface on one side of a surrounding frame, a boss intermediate the ends of the elongated member for engagement with said surface of the surrounding frame, and spring means acting between the elongated member and a part adapted to lie on the reverse side of the frame, so as to exert a force on the boss urging it into contact with the frame.

According to a preferred feature of the invention the louvre end fitting includes a separate bearing member connected to rotate with the boss, and having a flange adapted to lie on the reverse side of the frame and a spring abutment facing away from the boss, a fastening member passing through the bearing member, and connected to the boss, and a spring surrounding the fastening member and engaging the spring abutment on the bearing member and also an abutment at the head of the fastening member.

The bearing member may be movable axially relative to the boss, against the spring pressure.

Preferably the bearing member is formed integrally with an operating lever or stud.

According to another preferred feature of the invention the louvre end fitting has two spaced wiper blades and the channel formed between the two wiper blades extends continuously from one end to the other of the fitting, to allow water trapped between the blades to escape at the lower end.

To prevent entrance of water into the pivot aperture in the surrounding frame the boss preferably has a peripheral lip extending away from the groove receiving the louvre panel, so as to engage the surface of a surrounding frame and form a seal therewith.

According to yet another preferred feature of the invention the elongated member has two spaced parallel blades which are splayed apart so that they tend to bend outwards when urged into contact with a surrounding frame.

It is also preferred to locate the boss at a position displaced from the transverse centre line of the elongated member in a direction such that the gravitational out-of-balance force tends to close the associated window louvre.

The invention also consists in a pivoted window louvre assembly including a surrounding frame and a number of pivoting louvres mounted therein on parallel pivot axes, each louvre having louvre end fittings at opposite ends as defined above.

Figure 2:
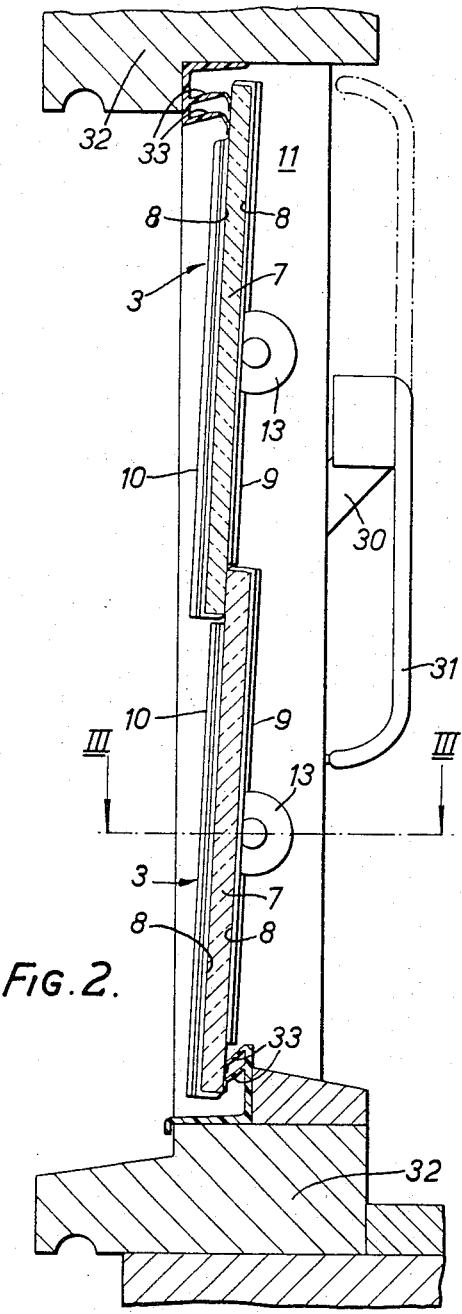
Figure 4:
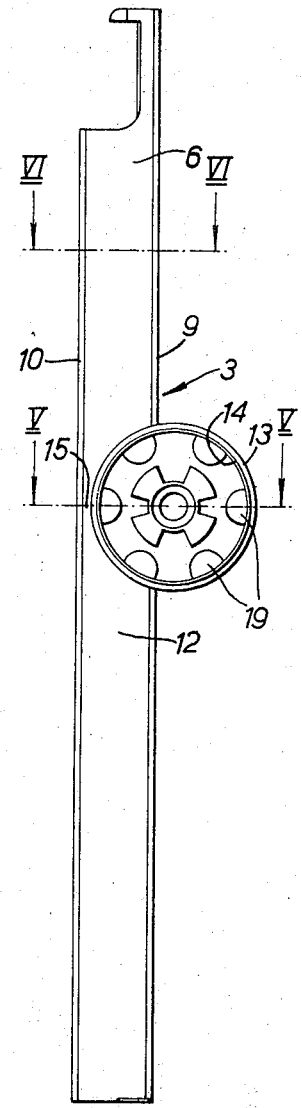
Figure 5:
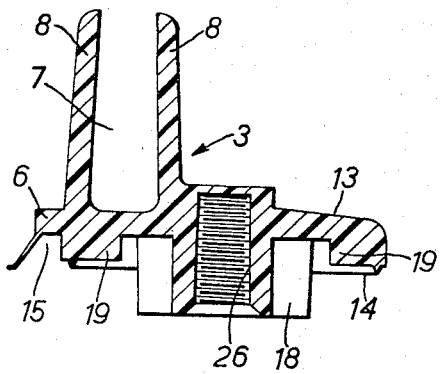
Figure 6:
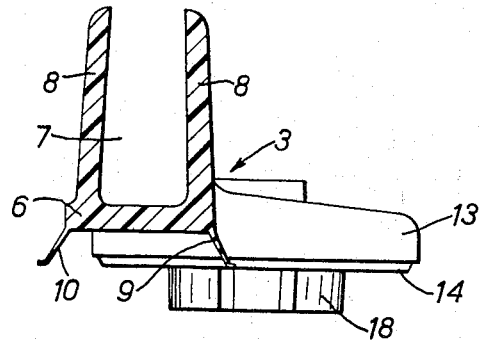

A pivoted window louvre assembly enbodying the invention will now be described by way of example with reference to the accompanying drawings, in which:

FIGURE 1 shows an exploded view of a louvre end fitting of the embodiment in association with a surrounding frame, FIGURE 2 shows a side view of one end of the assembled window louvre, FIGURE 3 is a section on the line III—III of FIGURE 2, FIGURE 4 is a rear view of part of the end fitting of FIGURE 1, and FIGURES 5 and 6 are sections on the lines V—V and VI—VI, respectively, of FIGURE 4.

The pivoted window louvre assembly comprises a surrounding frame 1 formed of channel-section aluminium members with two horizontally mounted pivoting louvres. Each louvre consists of a glass louvre panel 2 (FIGURE 3) having louvre end fittings 3 at opposite ends, the end fittings having separately formed bearing members 4 which pass through bearing apertures 5 in the surrounding frame 1 and are engaged by an operating mechanism within the channels of the frame. The operating mechanism will be referred to hereinafter.

Each end fitting 3 comprises an elongated channel member 6 formed as a one-piece synthetic plastic moulding, the particular preferred material being polypropylene. The member 6 provides a groove 7 to receive the edge of the glass louvre panel 2, the side flanges 8 of this groove being inclined inwards towards one another (FIGURES 5 and 6) so that when the panel is inserted therebetween they grip the edge of the panel by their natural resilience. Along the side of the member 6 opposite to that on which the channel member is formed there are formed a pair of spaced wiper blades 9 and 10 which are splayed apart at an included angle of approximately 60°, as seen in cross-section. The wiper blades 9 and 10 are formed integrally with the channel member 6 and are of extremely thin cross-section, thus having considerable resilience so that when the end fitting 3 is urged into contact with the surface 11 of the surrounding frame member 1, the two blades tend to splay apart further and form effective wiping seals with the frame.

Between the two wiper blades 9 and 10 there is a channel 12 which extends the full length of the channel member 6 and serves to allow water, which may enter between one or other of the blades, to escape at the lower end. At this end is provided a web 12′ which extends between the wiper blades 9 and 10 but of depth slightly less than the effective depth of the blades to allow said escape of water.

Adjacent the centre of each member 6 there is provided a circular boss 13 which has a thin peripheral flange or lip 14 which lies substantially flush with the edges of the wiper blades 9 and 10 and is designed to form a seal with the surface 11 of the surrounding frame 1. The boss 13 is off-set laterally from the longitudinal centre line of the channel member 6 so that the outer wiper blade 10 is out of contact with the boss and presents a continuous straight sealing edge. There is a gap 15 (FIGURE 4) between the peripheral lip 14 of the boss 13 and the straight outer wiper blade 10, through which gap water trapped between the blades 9 and 10 can flow downwards from the upper section to the lower section of the channel 12 between the blades.

In order to locate and support each end fitting 3 in position from the surrounding frame 1 a separately formed nylon bearing member 4, already referred to, is provided having a central bearing sleeve portion 16 which is designed to pass through the corresponding bearing aperture 5 in the frame 1 and engage the inner face 17 of the boss 13. A moulded spline connection 18, 18' resembling in cross-section a Maltese cross, provides a rotary drive connection between the channel member 6 and the bearing member 4, while allowing some relative axial movement between the two members. To reinforce this drive, auxiliary means in the form of projections 19 spaced around the periphery of the boss 13 and cooperating with corresponding recesses 19' in the sleeve portion 16 of the bearing member 4.

Each bearing member 4 is formed with a radial flange 20 which has a narrow circumferential ring 20' (FIGURE 3) on one annular face 21 thereof, designed to engage against the reverse face of the frame 1. The channel member 6 is urged towards the associated bearing member 4 by a resilient device including a helical compression spring 22 positioned within the bearing sleeve portion 16 of the bearing member and engaging at one end against an abutment flange 23 on that member, and at the other end against a washer 24 secured by a fastening screw 25 which cooperates with a threaded bore 26 in the spline connection 18 of the boss 13. Thus when assembled the spring 22 which acts by end thrust continually urges the end member 6 against the surface 11 of the frame 1 and so assists in providing an effective seal between the frame and the wiper blades 9 and 10 and the lip 14 of the boss 13.

The flange 20 on each bearing member 4 is formed integrally with two diametrically spaced driving studs 27 which are arranged to engage respectively in one of a pair of reciprocating bars 28 (FIGURE 3) positioned within the frame member 1. The bars 28 form part of the operating mechanism already referred to which operates in well-known manner to cause pivotal movement of each louvre simultaneously. Spring clips 29 (FIGURE 3) retain the bars 28 on the respective studs 27 and opposite movement of the bars is achieved by a link 30 (FIGURE 2) pivoted to each bar and provided with an operating handle 31. The handle 31 is pivoted to the link so that in the position shown in full lines in FIGURE 2 it serves in conjunction with the adjacent frame member 1 to lock the louvres in the closed position and can be pivoted to the broken line position from which the link 30 can be operated to open the louvres.

FIGURE 2 illustrates how the window assembly is fitted to a normal window frame 32, there being provided upper and lower sealing strips 33 on the latter.

The boss 13 may be off-set from the transverse centre line of the end fitting 3 as well as from the longitudinal centre line and in a direction such that a greater area of the glass louvre panel 2 lies below the boss. This results in a gravitational out-of-balance force tending to close the louvre panel. Also, wind pressure acting on the panel 2 will tend to close the panel.

I claim:
1. A louvre fitting comprising a frame member in combination with an end member having a groove on one side to receive the edge of a louvre panel, and at least one wiper blade on its oppoiste side for engagement with the surface on one side of a surrounding frame, a boss intermediate the ends of the end member for engagement with said surface of the surrounding frame, and spring means acting so as to exert a force continuously on the boss urging it into contact with the frame and including a separate bearing member connected to rotate with the boss, and having a flange adapted to lie on the reverse side of the frame and a spring abutment facing away from the boss, a fastening member passing through the bearing member, and connected to the boss, and a spring surrounding the fastening member and engaging the spring abutment on the bearing member and also an abutment at the head of the fastening member.

2. A louvre fitting according to claim 1 wherein the bearing member is movable axially relative to the boss, against the spring pressure.

3. A louvre fitting according to claim 1 wherein the bearing member is formed integrally with an operating lever or stud.

4. A louvre fitting according to claim 1, having two parallel spaced wiper blades, and in which a channel formed between the two wiper blades extends continuously from one end to the other of the fitting, to allow water trapped between the blades to escape at the lower end.

5. A louvre fitting according to claim 1, wherein a web is provided between the lower ends of the wiper blades to prevent draughts and which is of a depth slightly less than the effective depth of the wiper blades to allow said escape of water.

6. A louvre fitting according to claim 1, wherein the boss has a peripheral lip extending away from the groove receiving the louvre panel, so as to engage the surface of a surrounding frame and form a seal therewith.

7. A louvre fitting according to claim 1, wherein the end member has two spaced parallel blades which are sprayed apart so that they tend to bend outwards when urged into contact with a surrounding frame.

8. A louvre fitting according to claim 1, wherein the boss is displaced from the transverse centre line of the end member in a direction such that the gravitational out-of-balance force tends to close the window louvre.

References Cited

UNITED STATES PATENTS

| | | | |
|---|---|---|---|
| 2,601,707 | 7/1952 | Hyland | 49—88 |
| 2,726,426 | 12/1955 | Biggs | 49—403 X |
| 2,787,032 | 4/1957 | Brenner | 49—81 |
| 2,952,051 | 9/1960 | Scott | 49—371 |
| 3,084,405 | 4/1963 | Kahn et al. | 49—91 X |
| 3,170,547 | 2/1965 | Wilcox | 49—403 X |
| 3,084,405 | 4/1963 | Kahn et al. | 49—91 X |

FOREIGN PATENTS 228,806  6/1960  Australia.

DAVID J. WILLIAMOWSKY, *Primary Examiner.*

PHILLIP C. KANNAN, *Assistant Examiner.*

UNITED STATES PATENT OFFICE
CERTIFICATE OF CORRECTION

Patent No. 3,375,608                                April 2, 1968

Norman Thompson

It is certified that error appears in the above identified patent and that said Letters Patent are hereby corrected as shown below:

Column 4, line 9, "oppoiste" should read -- opposite --; line 45, "splayed" should read -- sprayed --.

Signed and sealed this 19th day of August 1969.

(SEAL)
Attest:

Edward M. Fletcher, Jr.                      WILLIAM E. SCHUYLER, JR.
Attesting Officer                                 Commissioner of Patents